United States Patent [19]

Crabb

[11] Patent Number: 5,293,948
[45] Date of Patent: Mar. 15, 1994

[54] UNDERCARRIAGE ASSEMBLY FOR A VEHICLE

[75] Inventor: Elmer R. Crabb, Aurora, Ill.

[73] Assignee: Caterpillar Inc., Peoria, Ill.

[21] Appl. No.: 950,547

[22] Filed: Sep. 25, 1992

[51] Int. Cl.$^5$ ............... B62D 55/084; B62D 55/15
[52] U.S. Cl. ................ 180/9.1; 180/9.48; 180/906; 305/21
[58] Field of Search ............ 305/21, 29, 30, 31, 305/56, 60; 180/9, 9.1, 9.5, 9.52, 10, 9.48, 906

[56] References Cited

U.S. PATENT DOCUMENTS

| | | | |
|---|---|---|---|
| 2,304,843 | 12/1942 | Nordquist | 198/807 |
| 2,535,762 | 12/1950 | Tapp et al. | 180/75 |
| 2,680,231 | 6/1954 | Kondracki | 180/9.48 |
| 4,364,443 | 12/1982 | Sato et al. | 180/9.5 |
| 4,834,478 | 5/1989 | Stevens et al. | 305/21 |
| 4,881,609 | 11/1989 | Purcell et al. | 180/9.5 |
| 4,923,257 | 5/1990 | Purcell | 305/29 |
| 5,018,591 | 5/1991 | Price | 180/9.5 |
| 5,050,710 | 9/1991 | Bargfrede | 188/71.6 |
| 5,127,714 | 7/1992 | Satzler | 305/60 |
| 5,191,952 | 3/1993 | Satzler et al. | 180/9.52 |

Primary Examiner—Russell D. Stormer
Attorney, Agent, or Firm—Claude F. White

[57] ABSTRACT

An undercarriage assembly for a work vehicle includes first and second roller frame assemblies, one on each side of the vehicle, an idler wheel assembly connected to one end of each roller frame assembly, and a drive wheel connected to the opposite end of each roller frame assembly. An endless elastomeric track belt encircles a respective drive wheel, roller frame assembly, and idler wheel assembly on each side of the vehicle. A rigid support beam connects each roller frame assembly to the main frame of the vehicle. Each idler wheel assembly includes first and second self-aligning mechanisms to provide that the track belt runs true and straight. The roller frame assemblies can be spaced laterally from the vehicle, using various size spacers, to provide various gage settings of the endless track belt. During adjustment of the roller frame assemblies, a supporting arrangement supports one track roller assembly by the other track roller assembly.

20 Claims, 6 Drawing Sheets

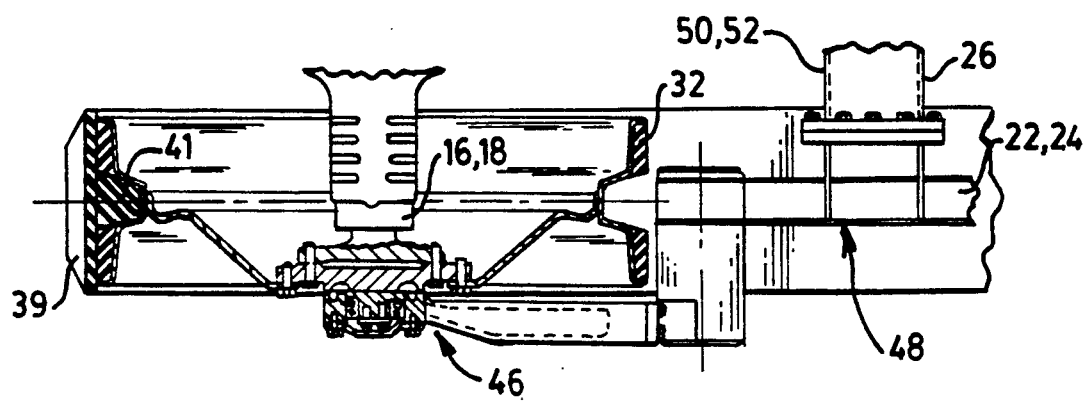
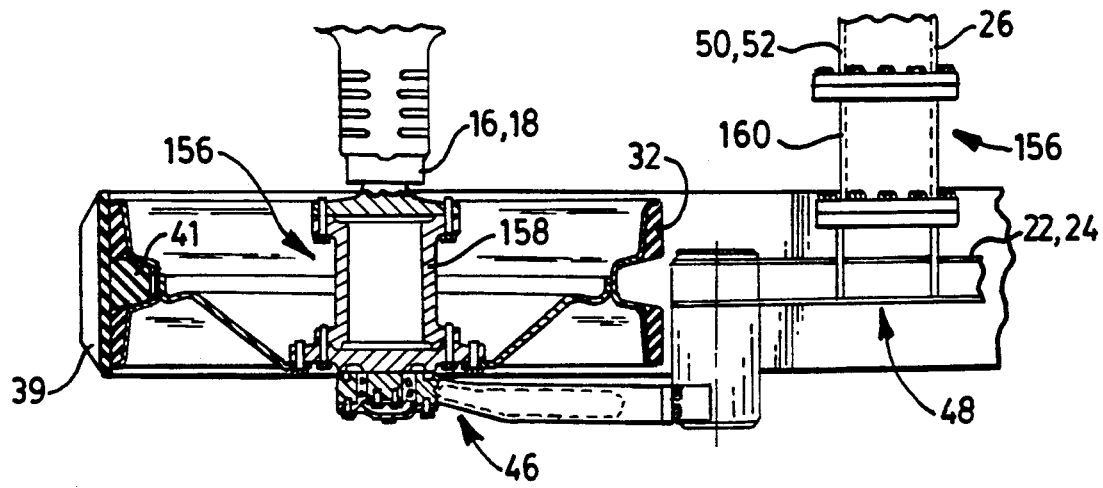

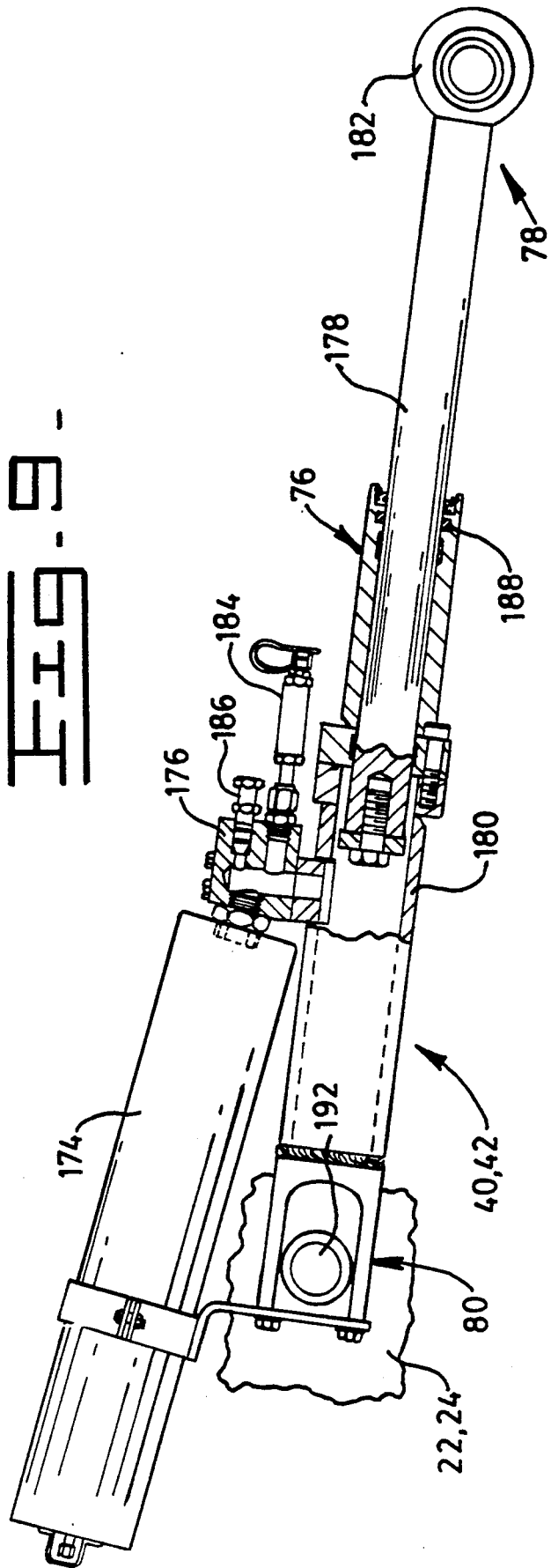

UNDERCARRIAGE ASSEMBLY FOR A VEHICLE

TECHNICAL FIELD

This invention relates generally to an undercarriage assembly for a work vehicle and more particularly to an undercarriage assembly which includes first and second roller frame portions, a plurality of guide rollers, first and second idler wheels, an endless elastomeric belt, and first and second self-contained hydraulic tensioning assemblies connected between respective first and second idler wheels and first and second roller frame portions.

BACKGROUND ART

Construction, earthmoving, and agricultural type work vehicles are often equipped with endless self-laying track chain assemblies for support and propulsion of the vehicle. Such prior art track type vehicles, utilizing metal track chain assemblies, are generally low speed, noisy vehicles and work in environments which do not require any adjustment to the track gauge. More recently, work vehicles having endless elastomeric track belts have been utilized to perform work tasks previously accomplished by metal track equipped vehicles. The vehicles having elastomeric track belts have many advantages over metal track vehicles and also over wheel type work vehicles. Some of these advantages include less weight and maintenance, lower soil compaction, lower noise levels, and the ability to travel on improved roadways.

One type of prior belted vehicle is disclosed in U.S. Pat. No. 4,817,746, issued to R. J. Purcell et al. on Apr. 4, 1989. In this patent, each of the endless elastomeric belts is driven by a pair of elevated drive wheels and is guided and supported by a pair of large diameter idler wheels and a plurality of smaller diameter guide rollers. The idler wheels and guide rollers are supported and suspended by a plurality of links, levers, and fluid cylinders. This large number of components in the undercarriage and suspension adds complexity, weight, and cost to the vehicle.

Another type of belted vehicle having a track roller frame assembly is disclosed in U.S. Pat. No. 4,836,318 issued to A. J. Tonsor et al. on Jun. 6, 1989. This patent discloses a vehicle having a track roller frame which is connected to the front of the vehicle by a pivot joint, and is connected to the rear of the vehicle by a collar which extends between the two drive wheels. The track roller frame also has an inside support device which connects the roller frame to the vehicle on the inside of the drive wheels. Although this type of suspension and track roller frame would appear to function satisfactorily for this particular type of vehicle, it is rather complex and limits the ground clearance under the vehicle. The roller frame supports between the drive wheels and to the inside of the drive wheels would also tend to collect dirt and debris.

The present invention is directed toward overcoming one or more of the problems as set forth above.

DISCLOSURE OF THE INVENTION

In one aspect of the present invention, an undercarriage assembly for a vehicle having a main frame and first and second drive axles includes first and second roller frame assemblies connected respectively to the drive axles, a support beam connected to the vehicle main frame and to each roller frame assembly, first and second self-aligning idler wheel assemblies, and first and second endless track assemblies and the idler wheel assemblies. The undercarriage assembly further includes first and second track tensioning mechanisms, a first self-aligning mechanism connecting each track tension mechanism to one of the idler wheel assemblies, and a second self-aligning mechanism connecting each track roller frame assembly to one of the idler wheel assemblies.

Prior art belted track vehicles generally incorporate endless belts having guide blocks on the inner side of the belt which guide and center the belt as the belt rotates around the drive wheel, guide rollers, and idler wheel. Each of the wheel and roller assemblies generally include a pair of spaced wheels with the space accommodating the guide blocks. If the belt does not run straight, the guide blocks contact the wheels and rollers, which generated excessive heat and accelerated wear.

The prior art belted track vehicles also utilize hydraulic cylinders to tension the belts and provide recoil functions. The tensioning cylinders, which are supported by the track roller frames, are connected by hydraulic lines to the vehicle hydraulic system. These lines are subject to wear and rupture which causes contamination of the entire vehicle hydraulic system.

The subject invention provides an undercarriage assembly having self-aligning idler wheel assemblies which adjust to properly center the drive belt. The subject invention further provides a self-contained hydraulic tensioning ram having no hydraulic connecting lines between the ram and the vehicle.

BRIEF DESCRIPTION OF THE DRAWINGS

FIG. 7 is a diagrammatic top plan view, partly in section, of a rear drive wheel, a drive axle, a portion of a roller frame assembly, and the connection between the roller frame assembly and the drive axle;

FIG. 8 is a diagrammatic top plan view, partly in section, similar to FIG. 7, with spacers between the drive wheel and the axle and between the roller frame assembly and the support beam; and FIG. 9 is a diagrammatic side elevational view of the self-contained hydraulic ram of the subject invention.

BEST MODE FOR CARRYING OUT THE INVENTION

Figure 1:
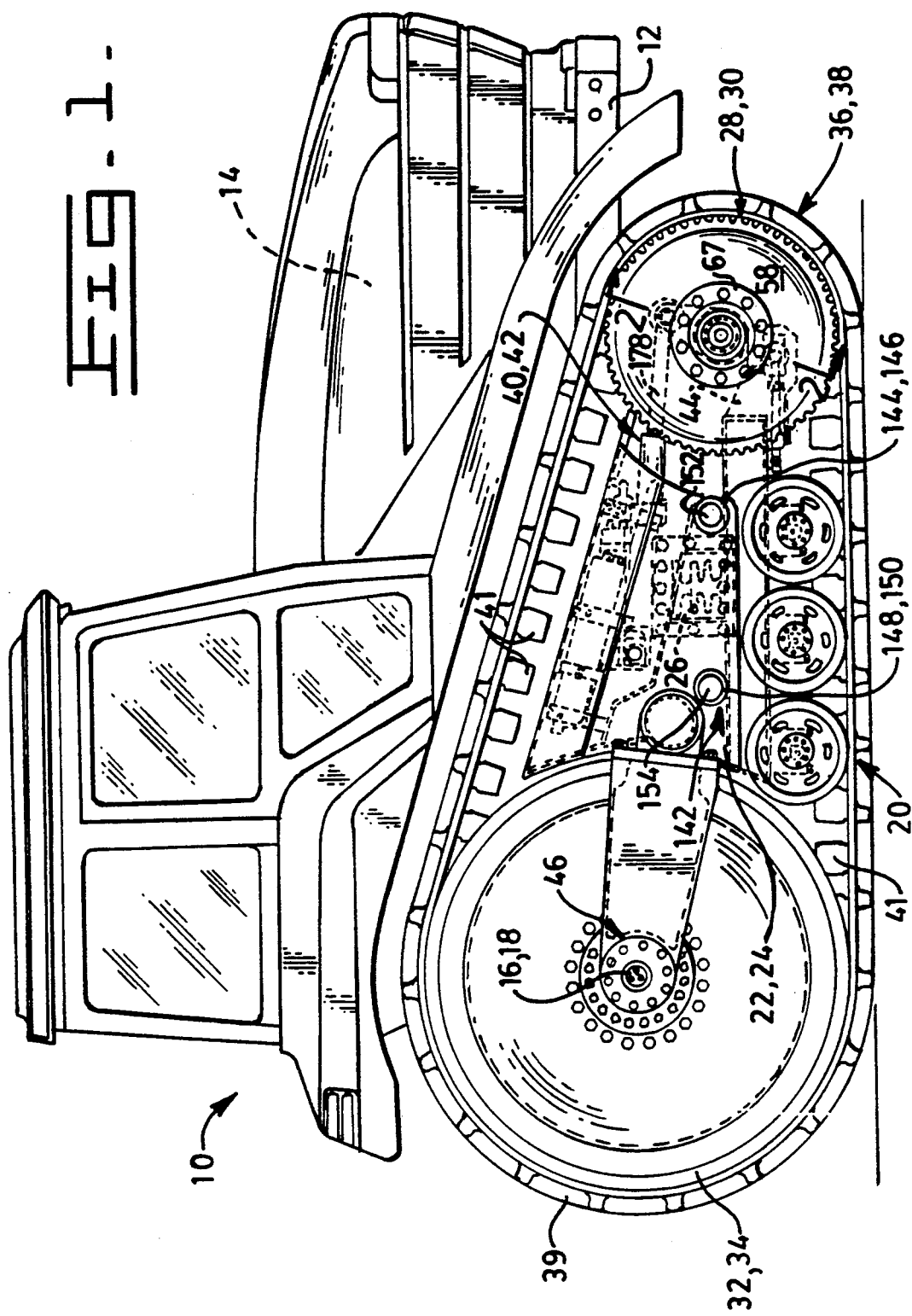
FIG. 1 is a diagrammatic side elevational view of a vehicle incorporating the subject invention.
Figure 2:
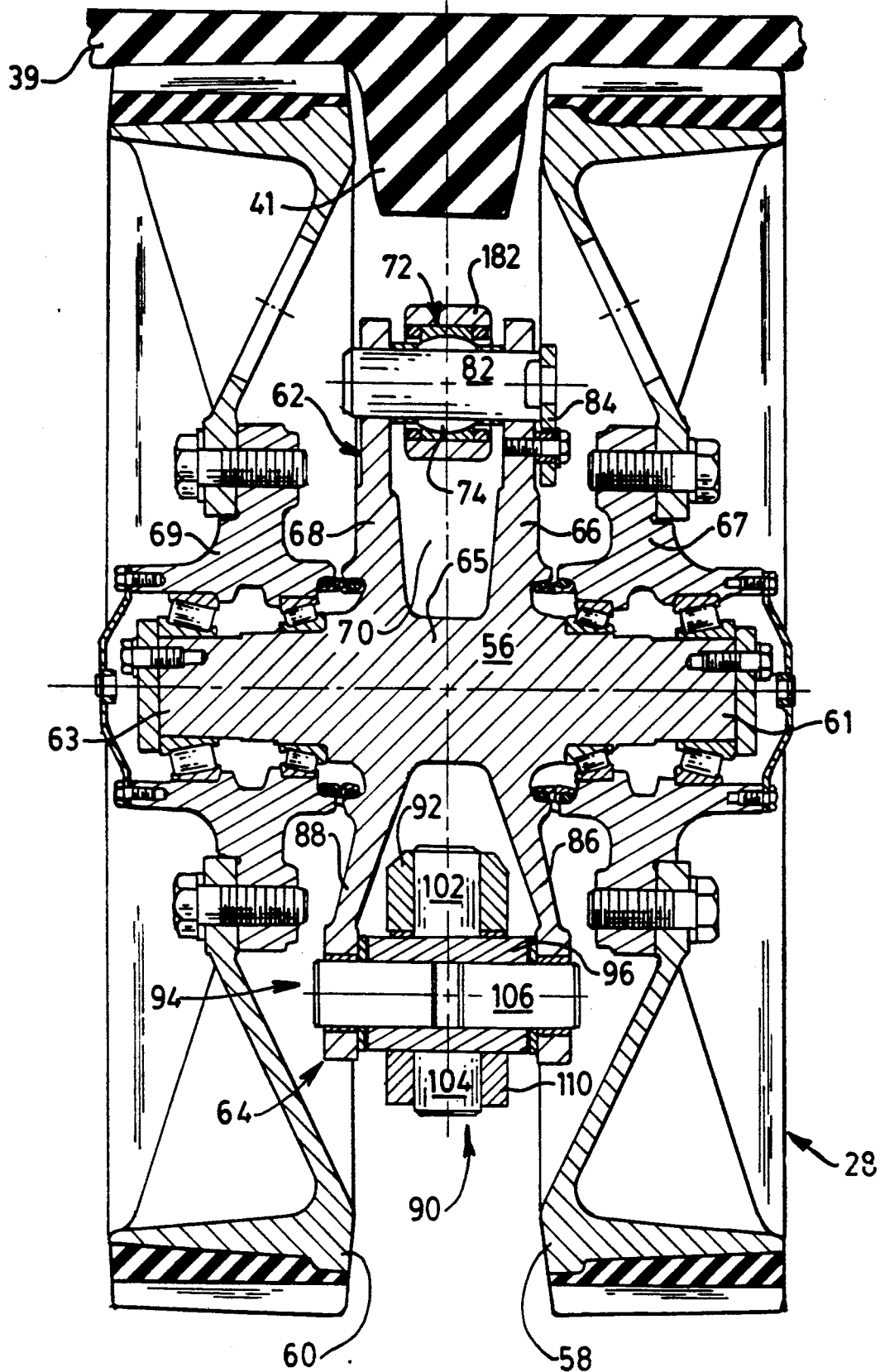
FIG. 2 is a diagrammatic cross-sectional view taken generally along the lines 2—2 of FIG. 1.
Figure 3:
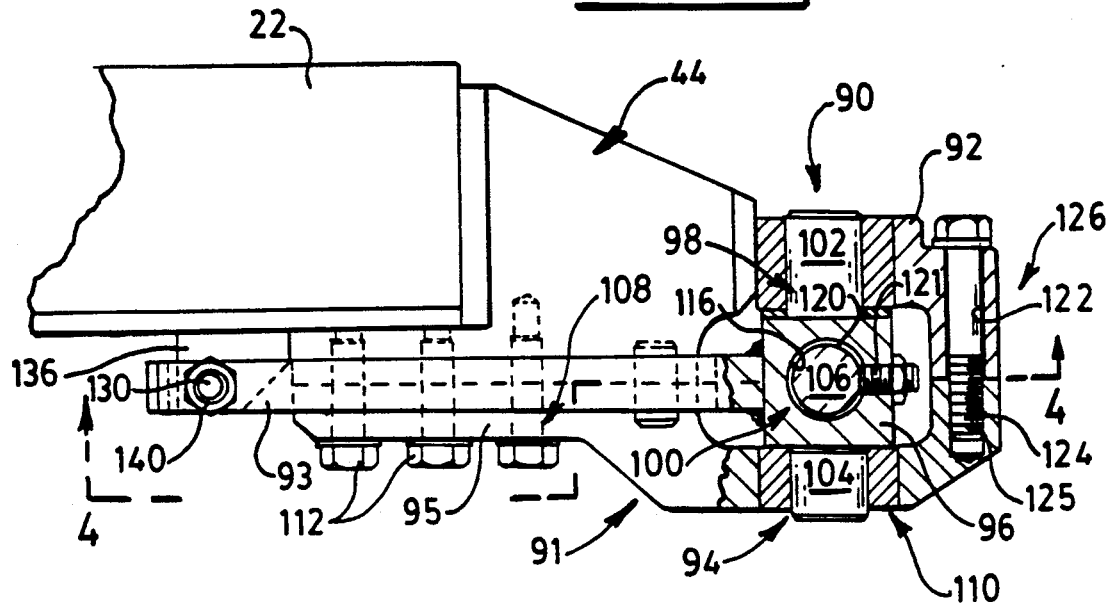
FIG. 3 is a diagrammatic side elevational view, partly in section, of a self-aligning mechanism of the present invention.
Figure 4:
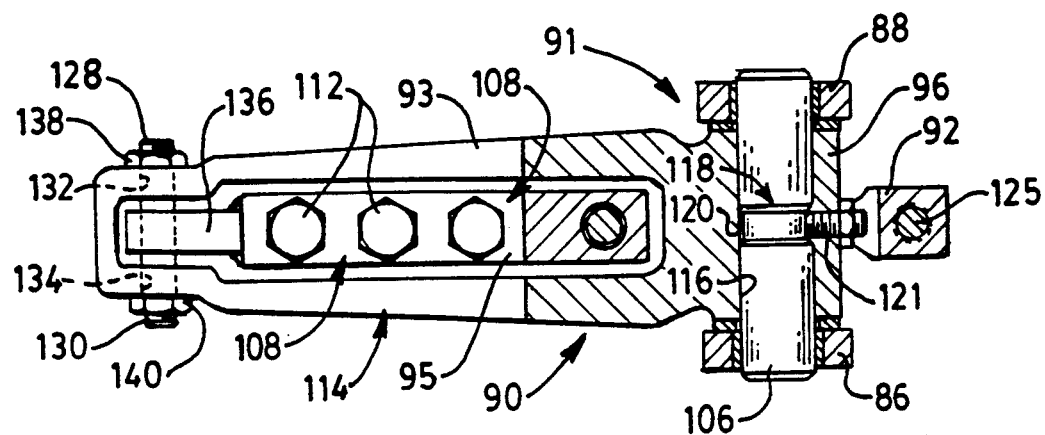
FIG. 4 is a diagrammatic cross-sectional view taken generally along the lines 4—4 of FIG. 3.

Referring to the drawings, a belted track vehicle 10 has a main frame 12, an engine 14, and first and second drive axles 16, 18 which are powered by the engine 14. An undercarriage assembly 20 for the vehicle includes first and second roller frame assemblies 22, 24, a support beam 26, first and second self-aligning idler wheel assemblies 28, 30, first and second drive wheels 32, 34, and first and second endless track assemblies 36, 38 encircling respectively the first and second drive wheels 32, 34, the first and second roller frame assemblies 22, 24, and the first and second idler wheel assemblies 28, 30.

Each of the track assemblies 36, 38 includes an endless elastomeric belt 39 which supports and propels the vehicle. The belt 39 has a plurality of inwardly facing guide blocks 41. The undercarriage assembly 20 further includes first and second self-contained hydraulic belt tensioning mechanisms 40, 42. It is to be understood that most of the components of the undercarriage assembly 20 on the left hand side of the vehicle 10, as shown in FIG. 1, are duplicated and are substantially similar to those components on the right hand side.

Each of the roller frame assemblies 22, 24 has first and second end portions 44, 46 and a middle portion 48, with the second end portions 46 being releasably connected to a respective first and second drive axle 16, 18. The support beam 26 has first and second end portions 50, 52 and a middle portion 54 which is releasably connected to the vehicle main frame 12. The first and second end portions 50, 52 are releasably connected to the middle portion 48 of a respective first and second roller frame assembly 22, 24.

Each of the idler wheel assemblies 28, 30 has a spindle 56 and first and second spaced wheels 58, 60 rotatably supported on the spindle 56. Each spindle 56 includes first and second spaced apart shaft portions 61, 63, a middle portion 65, and first and second plates 67, 69 rotatably connected to respective first and second shaft portions 61, 63. The wheels 58, 60 are connected to respective first and second plates 67, 69. Each spindle 56 also has first and second radially extending flange or ear portions 62, 64, with the first ear portion 62 having first and second spaced flanges 66, 68 which define a space 70 therebetween. A first self-aligning mechanism 72, including a spherical bearing assembly 74, is positioned between the flanges 66, 68 and within the space 70. Each of the track tensioning mechanisms 40, 42 includes an hydraulic ram assembly 76 having a first end portion 78 connected to a respective first spindle ear portion 62. A second end portion 80 of each ram assembly 76 is connected to a respective roller frame assembly 22, 24. The first self-aligning mechanism 72 serves to connect the first end portion 44 of each track tensioning mechanism 40, 42 to the first ear portion 62 of each spindle 56 by way of a retaining pin 82. The retaining pin 82 has a radially extending connecting portion 84 which is connected to the first flange or ear portion 62.

The second ear portions 64 include third and fourth spaced flanges 86, 88, and a second self-aligning mechanism 90 is positioned between and connected to these flanges 86, 88. A means 92 for pivotally connecting the second self-aligning mechanism 90 to the roller frame 22 includes a lever member 93 and a cap member 95. The first end portion 44 of each roller frame assembly 22, 24 has a forwardly extending nose portion 92 and the second self-aligning mechanism 90 connects the nose portion 92 to the second flange, or ear, portion 64 of each spindle 56. The second self-aligning mechanism 90 serves to releasably connect each spindle 56 to the first end portion 44 of each roller frame assembly 22, 24.

The second self-aligning mechanism 90 includes a universal type apparatus 94 having a block portion 96 having first and second connecting portions 98, 100. The first connecting portion 98 includes first and second connecting pins 102, 104 and the second connecting portion 100 includes a third connecting pin 106. The third connecting pin 106 is positioned at an angle which is substantially normal to the first and second pins 102, 104. The third and fourth spaced flanges 86, 88 are adapted to be pivotally connected to said third connecting pin 106. The universal type apparatus 94 includes the lever member 93 and the cap member 95, with the block portion 96 forming a portion of the lever member 93. The cap member 95 has a mounting portion 108 and a pin receiving portion 110, with the mounting portion 108 being connected to the roller frame assembly 22 by a plurality of threaded fasteners 112. The pin receiving portion 110 is adapted to receive the second connecting pin 104 of the universal type apparatus 94.

The lever member 93 includes a bifurcated yoke portion 114 at one end and the block portion 96 at the opposite end. The yoke portion 114 is adapted to surround the mounting portion 108 of the cap member 95. The block portion 96 has a bore 116 extending therethrough at an angle which is substantially normal to the first and second connecting pins 102, 104. The third connecting pin 106 is positioned within the bore 116 and, as previously noted, pivotally connects the third and fourth flanges 86, 88 to the block portion 96. A securing means 118, such as a circumferential groove 120 in the pin 106 and a threaded fastener 121 extending through the block portion 96, secures the pin 106 within the bore 116.

The forwardly extending nose portion 92 is adapted to receive the first connecting pin 102, and in combination with the cap member 95 and the second connecting pin 104, pivotally connects the idler wheel assembly 28 to the roller frame assembly 22. A bore 122 in the extending nose portion 92, a threaded bore 124 in the pin receiving portion 110 of the cap member 95, and a threaded fastener 125 which penetrated the bore 120 and engages the threaded bore 122, provides a means 126 for connecting the extending nose portion 92 to the pin receiving portion 110.

First and second threaded fasteners 128, 130, and corresponding first and second threaded holes 132, 134 in the yoke portion 114 Of the lever member 93 provide a means for moving the yoke portion 114 laterally relative to the cap member 95. The threaded fasteners 128, 130 are adapted to engage an extension 136 of the roller frame assembly 22. First and second lock nuts 138, 140 engage the respective first and second threaded fasteners 128, 130 and the yoke portion 114 to provide a means for locking the yoke portion 114 at a plurality of positions.

Figure 5:
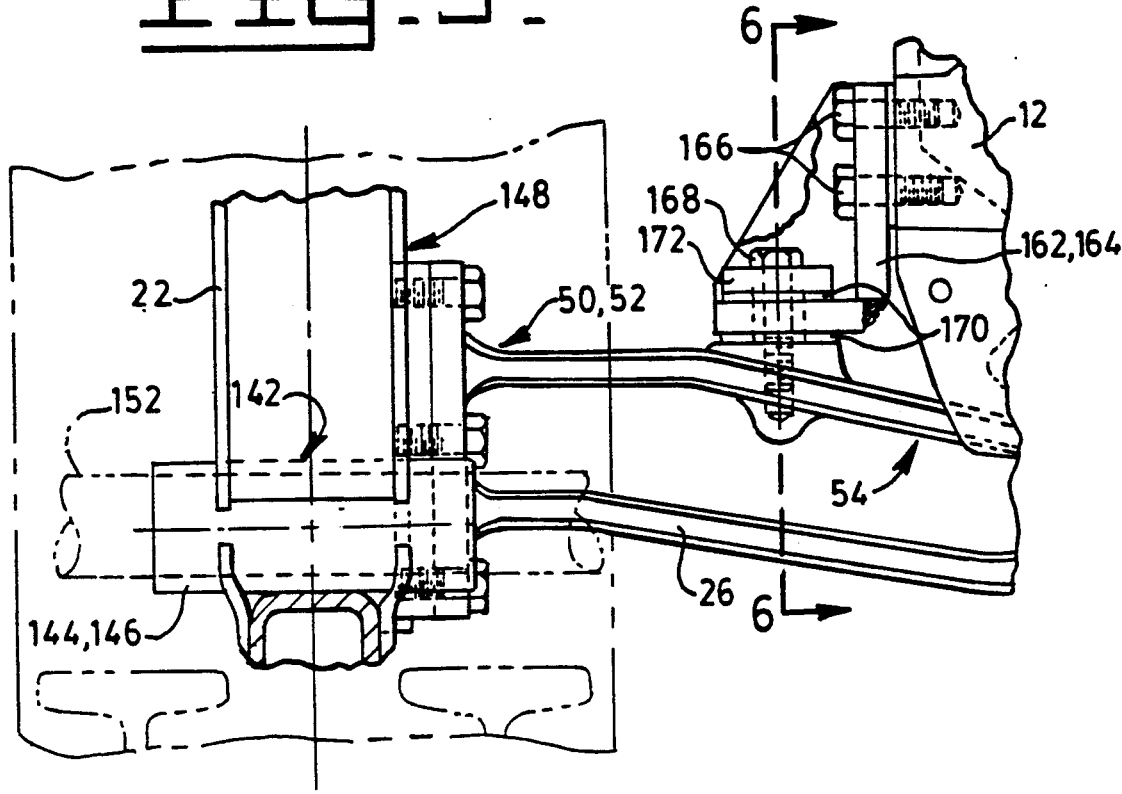
FIG. 5 is a diagrammatic front elevational view, partly in section, of a portion of the support beam, the vehicle frame, and the undercarriage roller frame.
Figure 6:
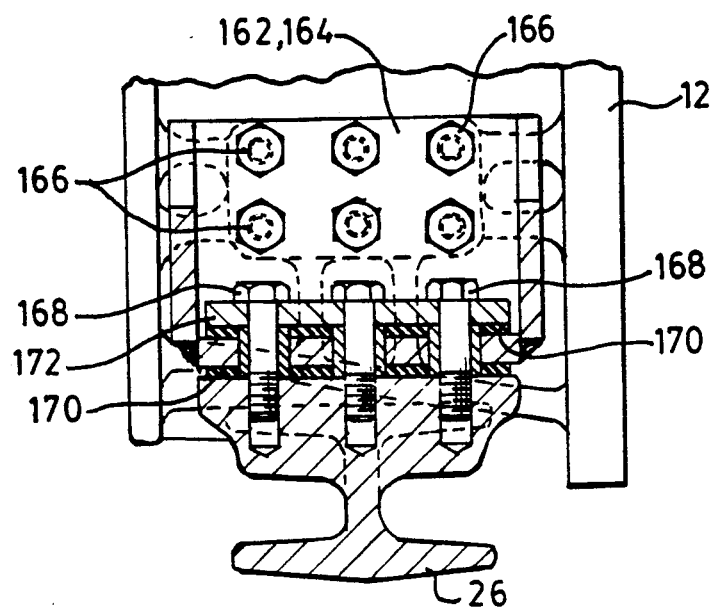
FIG. 6 is a diagrammatic side elevational view, partly in section, taken generally along the lines 6—6 of FIG. 5.

With particular reference to FIGS. 1 and 5, a means 142 is provided for supporting the first roller frame assemble 22 by the second roller frame assembly 24 when the first roller frame assembly 22 is disconnected from the first drive axle 16 and from the support beam 26. The means 142 includes first and second heavy walled tube sections 144, 146 connected, as by welding, to the first roller frame assembly 22, and third and fourth heavy walled tube sections 148, 150 connected to the second roller frame assembly 24. The supporting means 142 further includes a first bar 152 extending through the first and third tubes 144, 148 and a second bar 154 extending through the second and fourth tubes 146, 150. The same supporting means 142 is used to support the second roller frame assembly 24 by the first roller frame 22 when the second roller frame assembly 24 is disconnected from the second drive axle 18 and from the support beam 26. The first and third tube sections 144, 148 are substantially axially aligned. The first and second bars 152, 154, extend completely across the vehicle 10 and beneath the main frame 12 to engage and extend through the respective tube sections 144, 148 and 146, 150.

With particular reference to FIGS. 5, 6, 7, and 8, a means 156 is provided for positioning each of the roller frame assemblies 22, 24 at a plurality of locations laterally spaced from the main frame 12. The positioning means 156 includes a plurality of first and second spacers 158, 160. The first spacers 158 are adapted to be connected between the second end portions 46 of the roller frame assemblies 22, 24, and the drive axles 16, 18. The second spacers 160 are adapted to be connected between the middle portions 48 of the roller frame assemblies 22, 24 and the first and second ends 50, 52 of the support beam 26. The spacers 158, 160 provide adjustment of the gage setting of the endless track assemblies 36, 38. Although only one set of spacers 158, 160 is illustrated, it is understood that a plurality of different sizes of spacers can be used for varying the gage settings. The supporting means 142 are utilized during the changing of the track gage.

First and second brackets 162, 164 releasably connect the middle portion 54 of the support beam 26 to the main frame 12 of the vehicle 10. The brackets 162, 164 are connected to the main frame 12 by a plurality of first threaded fasteners 166 and to the support beam 26 by a plurality of second threaded fasteners 168. A plurality of resilient spaces 170 are positioned between the support beam and the brackets 162, 164, and between a clamp plate 172 and the brackets 162, 164 and are compressed by the second threaded fasteners 168. This provides a resilient mounting of the support beam 26.

With particular reference to FIGS. 1 and 9, each of the track tensioning mechanisms 40, 42 includes the hydraulic ram assembly 76, an accumulator 174, and a manifold block 176. The hydraulic ram assembly 76 includes a rod 178 and a pressure chamber 180. The accumulator 174 is in direct fluid communication with the pressure chamber 180 through the manifold block 176. The rod 178 includes an eye portion 182 which connects with the first flange portion 62 of the idler assemblies 28, 30. The manifold block 176 includes a fill and shut-off valve assembly 184 and a bleed valve 186. The pressure chamber 180 and accumulator 174 are initially pressurized from a remote hydraulic source, such as the hydraulic implement circuit of the vehicle 10. Once pressurized, the track tensioning mechanisms 40, 42 are substantially self sustaining, since they are void of any hydraulic connections to the vehicle 10. One of more pressure seals 188, which seal on the polished surface of the rod 178, prevent any appreciable fluid leakage from the pressure chamber 180. If the pressure chamber ever needs recharging, the fill and shut-off valve 184 is used. The second end portions 80 of each ram assembly 76 is connected to the roller frame assemblies 22, 24 by mounting pins 192.

INDUSTRIAL APPLICABILITY

With reference to the drawings, the subject invention is particularly useful on agricultural type work vehicles, and more specifically on work vehicles which are supported and propelled by endless elastomeric track belts. It is advantageous that such vehicles have good traction, low ground pressure, low soil compaction, relatively high ground clearance, and have variable gage capabilities. The variable gage is especially useful for operating the vehicle in agricultural fields having different row crop spacings.

The vehicle 10 is supported and propelled by an undercarriage assembly 20 which includes first and second roller frame assemblies 22, 24, first and second idler assemblies 28, 30, first and second drive wheels 32, 34, and first and second endless track assemblies 36, 38. A self-contained hydraulic belt tensioning mechanism 40, 42 is connected at one end to the roller frame assembly 22, 24 by a pin 192, and is connected at the opposite end to the first self-aligning mechanism 72 by the eye portion 182. The second self-aligning mechanism 90 connects each idler assembly 28, 30 to the roller frame assemblies 22, 24 and provides pivoting of the idler assemblies 28, 30 about the third pin 106 and against the force of the tensioning mechanism 40, 42. The first and second self-aligning mechanism 72, 90 provide for self alignment of the belt 39 on the idler assemblies 28, 30 and prevent extended contact between the guide blocks 41 and the wheels 58, 60.

The gage of the track belts is changed by disconnecting the first end portion 44 and the middle portion 48 of the roller frame assembly 22 from the respective drive axle 16 and the support beam 26. A predetermined spacer 158 and 160 is connected between the drive axle 16 and the roller frame assembly 22 and between the support beam 26 and the roller frame assembly. This procedure is then repeated for the opposite side of the vehicle 10 with the second roller frame assembly 24. While the first roller frame assembly 22 is disconnected from the axle 16 and the support beam 26, it is supported by the supporting means 142 and the second roller frame assembly 24. Likewise, when the second roller frame assembly 24 is disconnected from the axle 16 and the support beam 26, it is supported by the supporting means 142 and the first roller frame assembly 22. During adjustment of the track gage, additional mechanical means are required to move the roller frame assemblies 22, 24 to the proper position along the supporting means 142.

Recoil function is provided by the tensioning mechanisms 40, 42. If debris or foreign material become lodged between the idler wheel assembly 28 and the belt 39, the idler wheel assembly 28 swings rearwardly against the tensioning mechanism 40. The rod 178 moves into the pressure chamber 180 and forces hydraulic fluid into the accumulator 174, which further compresses the gas in the accumulator 174. Once the foreign material exits the area between the idler wheel assembly 28 and the belt 39, the force in the accumulator returns the idler wheel assembly 28 to its original position.

Other aspects, objects and advantages of this invention can be obtained from a study of the drawings, the disclosure, and the appended claims.

I claim:

1. An undercarriage assembly for a vehicle, said vehicle having a main frame, an engine, and first and second drive axles powered by said engine, said undercarriage assembly comprising:

first and second roller frame assemblies, each having first and second end portions and a middle portion, said second end portions being releasably connected to a respective first and second drive axle;

a support beam having first and second end portions and a middle portion, said first and second end portions being releasably connected to a respective middle portion of said first and second roller frame assemblies, said support beam middle portion being releasably connected to said vehicle main frame;

first and second self-aligning idler wheel assemblies, each having a spindle and first and second spaced wheels rotatably supported on said spindle, said spindle being releasably connected to a first end portion of a respective roller frame assembly, each of said spindles having first and second radially extending ear portions;

first and second endless track assemblies encircling respectively said first and second roller frame assemblies and said first and second idler wheel assemblies;

first and second track tensioning mechanisms, each including a hydraulic ram assembly having a first end portion connected to a respective first spindle ear portion and a second end portion connected to a respective roller frame assembly; and a first self-aligning mechanism connecting the first end portion of each track tensioning mechanism to said first ear portion of each spindle, and a second self-aligning mechanism connecting the first end portion of each roller frame assembly to said second ear portion of each spindle.

2. An undercarriage assembly, as set forth in claim 1, wherein said first self-aligning mechanisms include a spherical bearing assembly.

3. An undercarriage assembly, as set forth in claim 1, wherein said first ear portions include first and second spaced flanges and said first self-aligning mechanisms are positioned between said first and second flanges.

4. An undercarriage assembly, as set forth in claim 2, wherein each of said ear portions include first and second flanges defining a space therebetween and said spherical bearing assembly is positioned within one of said spaces.

5. An undercarriage assembly, as set forth in claim 1, wherein said second ear portions include third and fourth spaced flanges and said second self-aligning mechanism is positioned between said third and fourth flanges.

6. An undercarriage assembly, as set forth in claim 1, wherein said second self-aligning mechanism includes an universal type apparatus having first and second connecting portions, said first connecting portion being positioned normal to said second connecting portion.

7. An undercarriage assembly, as set forth in claim 6, wherein said universal type apparatus includes a lever member, said lever member having a yoke portion and a block portion, said first and second connecting portions forming a portion of said block portion, said first connecting portion having first and second connecting pins, and said block portion having a bore extending through said block portion at an angle substantially normal to said first and second connecting pins, and a third connecting pin positioned within said bore.

8. An undercarriage assembly, as set forth in claim 7, wherein said universal type apparatus includes a cap member having a mounting portion and a pin receiving portion, said mounting portion adapted to be connected to said roller frame assembly and said pin receiving portion adapted to receive said second connecting pin, said yoke portion of said lever member being adapted to surround said mounting portion.

9. An undercarriage assembly, as set forth in claim 1, including means for supporting said first roller frame assembly by said second roller frame assembly when said first roller frame assembly is disconnected from said first drive axle and from said support beam, and means for supporting said second roller frame assembly by said first roller frame assembly when said second roller frame assembly is disconnected from said second drive axle and from said support beam.

10. An undercarriage assembly, as set forth in claim 9, wherein said supporting means include a plurality of first tubular members connected to said first roller frame assembly and a plurality of second tubular members connected to said second roller frame assembly, each of said first tubular members being axially aligned with one of said second tubular members, and a plurality of elongated bars, each bar being adapted to extend through respective pairs of first and second tubular members.

11. An undercarriage assembly, as set forth in claim 1, wherein each of said track tensioning mechanism includes an hydraulic ram assembly having an hydraulic pressure chamber, an accumulator, and a manifold block, said pressure chamber and said accumulator being in direct fluid communication through said manifold block.

12. An undercarriage assembly, as set forth in claim 1, including means for positioning each of said roller frame assemblies at a plurality of locations laterally spaced from said main frame.

13. An undercarriage assembly, as set forth in claim 12, wherein said positioning means includes a plurality of spaces adapted to be connected between said roller frame assemblies and said drive axle and between said roller frame assemblies and said support beam.

14. An undercarriage assembly for a vehicle, said vehicle having a main frame and first and second drive axles, said undercarriage assembly comprising:

first and second roller frame assemblies, each having first and second end portions and a middle portion, said second end portions being releasably connected to a respective first and second drive axle;

a support beam having first and second end portions and a middle portion, said first and second end portions being releasably connected to a respective middle portion of said first and second roller frame assemblies;

first and second self-aligning idler wheel assemblies, each having a spindle having first and second radially extending flange portions, said first end portion of a respective roller frame assembly being connected to a second flange portion;

first and second endless track assemblies encircling respectively said first and second roller frame assemblies and said first and second idler wheel assemblies;

first and second track tensioning mechanism, each including a hydraulic ram assembly having a first end portion connected to a respective first flange portion of each spindle and a second end portion connected to a respective roller frame assembly; and means for supporting said first and second roller frame assemblies, one supported by the other, when one of said roller frame assemblies is disconnected from the drive axle and from the supporting beam.

15. An undercarriage assembly, as set forth in claim 14, wherein each of said self-aligning idler wheel assemblies include a spherical bearing associated with said first flange portion, and a universal type apparatus associated with said second flange portion.

16. An undercarriage assembly, as set forth in claim 15, wherein said universal type apparatus includes a lever member having a block portion; said block portion having first, second and third connecting pins, said second flange portion being connected to said third connecting pin, and said first end portion of each roller frame assembly being connected to said second and third connecting pins.

17. An undercarriage assembly, as set forth in claim 16, including a cap member having a mounting portion and a pin receiving portion, said mounting portion adapted to be connected to said roller frame assembly and said pin receiving portion adapted to receive said second connecting pin.

18. An undercarriage assembly, as set forth in claim 14, wherein each of said track tensioning mechanisms includes an accumulator and a manifold block, said accumulator being in direct fluid communication with said hydraulic ram through said manifold block.

19. An undercarriage assembly, as set forth in claim 14, including a plurality of spacers adapted to be connected between said roller frame assemblies and said drive axle and between said roller frame assemblies and said support beam.

20. An undercarriage assembly, as set forth in claim 14, wherein said supporting means include a plurality of first and second tubular members connected respectively to said first and second roller frame assemblies, each of said first tubular members being in axial alignment with one of said second tubular members, and a plurality of elongated bars, each bar being adapted to extend through respective pairs of first and second tubular members.

* * * * *